(12) United States Patent
Lagerqvist et al.

(10) Patent No.: US 9,351,310 B2
(45) Date of Patent: May 24, 2016

(54) METHOD IN A BASE STATION FOR ALLOCATING COMMUNICATION RESOURCES TO A USER EQUIPMENT, BASE STATION, COMPUTER PROGRAM AND COMPUTER PROGRAM PRODUCT

(75) Inventors: Tomas Georg Lagerqvist, Stockholm (SE); Malin Ljungberg, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/111,284

(22) PCT Filed: Apr. 12, 2011

(86) PCT No.: PCT/SE2011/050440
§ 371 (c)(1),
(2), (4) Date: Oct. 11, 2013

(87) PCT Pub. No.: WO2012/141625
PCT Pub. Date: Oct. 18, 2012

(65) Prior Publication Data
US 2014/0031052 A1     Jan. 30, 2014

(51) Int. Cl.
*H04W 72/10*     (2009.01)
*H04W 24/04*     (2009.01)
(Continued)

(52) U.S. Cl.
CPC .......... *H04W 72/10* (2013.01); *H04W 72/1268* (2013.01); *H04W 72/1226* (2013.01); *H04W 72/1242* (2013.01); *H04W 72/1247* (2013.01)

(58) Field of Classification Search
CPC .......... H04W 72/042; H04W 72/0413; H04W 72/0406; H04W 24/02; H04W 24/04; H04W 72/04; H04W 72/0446; H04W 36/0016; H04W 36/0033; H04W 56/0045; H04W 72/0466; H04W 76/021; H04W 76/023; H04W 16/14

USPC ......... 370/241, 312, 315, 328, 203, 209, 225, 370/230, 255, 331, 350, 329, 280, 252, 330, 370/336, 235, 311; 455/452.1, 450, 561, 455/436, 437, 438

See application file for complete search history.

(56) References Cited

U.S. PATENT DOCUMENTS

2009/0207797 A1    8/2009  Shen et al.
2010/0195575 A1*   8/2010  Papasakellariou et al. ... 370/328
(Continued)

FOREIGN PATENT DOCUMENTS

EP      2242303 A2    10/2010
WO   2010065280 A2     6/2010
(Continued)

OTHER PUBLICATIONS

3GPP, "3rd Generation Partnership Project; Technical Specification Group Radio Access Network; Feasibility study for Further Advancements for E-UTRA (LTE-Advanced) (Release 10)", 3GPP TR 36.912 V10.0.0, Mar. 2011, 62 pages.

*Primary Examiner* — Inder Mehra
(74) *Attorney, Agent, or Firm* — Rothwell, Figg, Ernst & Manbeck, P.C.

(57) ABSTRACT

The invention relates to a method 50 in a base station 2 for allocating communication resources to a user equipment 4, 5, . . . , n. The base station 2 supports the use of a single physical resource block, PRB, scheduling resource for two or more user equipment 4, 5, . . . , n. The method 50 comprises: receiving 51, from a user equipment 4, 5, . . . , n, a scheduling request on the PRB scheduling resource; and granting access 52 to a selected user equipment 4, 5, . . . , n of the two or more user equipment 4, 5, . . . , n using the PRB scheduling resource. The invention also relates to a base station, computer program and computer program products.

10 Claims, 7 Drawing Sheets

(51) Int. Cl.
*H04W 72/04* (2009.01)
*H04W 72/12* (2009.01)

(56) References Cited

U.S. PATENT DOCUMENTS

2012/0170524 A1* 7/2012 Ren et al. .................. 370/329
2013/0176871 A1* 7/2013 Bertze et al. ............... 370/252
2013/0301541 A1* 11/2013 Mukherjee ........ H04W 74/0833
370/329

FOREIGN PATENT DOCUMENTS

| WO | WO 2010/065280 | * | 6/2010 | ............ H04W 24/10 |
| WO | WO 2010065280 | * | 6/2010 | ............ H04W 72/12 |
| WO | 2010085187 A1 | | 7/2010 | |
| WO | 2011038780 A1 | | 4/2011 | |

* cited by examiner

METHOD IN A BASE STATION FOR ALLOCATING COMMUNICATION RESOURCES TO A USER EQUIPMENT, BASE STATION, COMPUTER PROGRAM AND COMPUTER PROGRAM PRODUCT

CROSS REFERENCE TO RELATED APPLICATION(S)

This application is a 35 U.S.C. §371 National Phase Entry Application from PCT/SE2011/050440 filed Apr. 12, 2011, the disclosure of which is incorporated by reference.

FIELD OF THE INVENTION

The invention relates to methods in a base station for allocating communication resources to a user equipment.

BACKGROUND OF THE INVENTION

Long Term Evolution (LTE) is a standard within the 3GPP (3rd Generation Partnership Project) with an aim to improve the UMTS (Universal Mobile Telecommunications System) mobile phone standard for coping with future technology evolutions.

In LTE, a physical uplink control channel (PUCCH) is used for conveying uplink control information, such as for example channel quality indication (CQI) and uplink scheduling requests. A user equipment (UE) has two ways of notifying a scheduler in a base station (denoted evolved Node B or eNB in LTE) that is has data to transmit. The UE may have a PUCCH scheduling resource for scheduling requests (SR), and in such case it simply uses this PUCCH scheduling resource to send the scheduling request to the base station thus notifying that it has data to transmit. The scheduling request can be seen as a simple flag (single bit) and there is no need to provide the identity of the UE since this is implicitly known from the identity of the PUCCH scheduling resource on which the scheduling request was sent. The second way for a UE to send a scheduling request, if the UE does not have a PUCCH scheduling resource, is to instead perform a random access (RA) procedure.

The 3GPP LTE standard thus supports the UE having a PUCCH scheduling resource or the UE using a RA procedure for the scheduling request. However, in order for all users to have a scheduling resource it is necessary to use a large portion of the available physical resource blocks (PRB) for PUCCH, which limits the number of PRBs that are available for traffic data.

There are also drawbacks with the use of RA procedure for the UE to notify the scheduler of the base station that it has data to send. Firstly, the use of RA procedure entails more messaging between the UE and the base station, which increases the delay before the UE is scheduled for data transmission. Secondly, the processing load in the base station for handling the RA procedures may be higher than for handling scheduling requests on PUCCH. Using RA procedures thus means that the base station would have to be optimized for a higher RA load, which entails higher costs for processing capacity.

In practice, the amount of available scheduling resources limits the number of users that can be handled in a communication system with low delay.

Further, since the scheduling resources form a bottleneck, the base station needs to reserve scheduling resources for prioritized UEs, e.g. emergency calls. This further adds to the complexity of the scheduling resource handling functionality of the base station.

From the above it is clear that the PUCCH resources are limited and used at the expense of traffic resources, and that the alternative, using RA procedures, entails longer delays for the user before being granted access. It is clear that there is a need for an improvement on this situation in this field of technology.

SUMMARY OF THE INVENTION

It is an object of the invention to enable fast grant of scheduling requests for user equipment while maximizing the available user data traffic capacity.

In a first aspect of the invention, the object is achieved by a method in a base station for allocating communication resources to a user equipment. The base station supports the use of a single physical resource block, PRB, scheduling resource for two or more user equipment. The method comprises: receiving, from a user equipment, a scheduling request on the PRB scheduling resource; and granting access to a selected user equipment of the two or more user equipment using the PRB scheduling resource. By means of the invention, a base station is able to allocate scheduling resources to a larger number of user equipment. In a baseline solution any additional user equipment beyond the number of available scheduling request resources, would have to request transmission by performing a random access procedure, with the entailing drawbacks of such procedure. In contrast, the invention increases the number or user equipment able to use a dedicated scheduling resource. The average access time for such additional user equipments will be lower compared to the baseline solution. The invention thus allows a base station to handle a larger number of user equipment with a smaller average delay compared to the baseline solution. Furthermore, the complexity of handling scheduling requests in the base station can be reduced, since, by means of the invention, there is no need to reserve scheduling request resources for prioritized user equipment, such as emergency calls.

In an embodiment, the step of granting access comprises determining the highest prioritized user equipment using the PRB scheduling resource, and granting access to the determined highest prioritized user equipment.

In an embodiment, the step of granting access comprises: determining identity of the user equipment sending the scheduling request; and granting access to the identified user equipment.

In the above embodiment, the step of determining the identity of user equipment may comprise: among the user equipment using the PRB scheduling resource eliminating as candidates for having sent the scheduling request user equipment: involved in sending data traffic, being in discontinuous reception state, being out of synchronization, and determining the identity of user equipment having sent the scheduling request to be the remaining user equipment if only one.

In the above embodiment, in case of failing to determine identity of the user equipment having sent the scheduling request, the step of granting access comprises granting access to a prioritized user equipment among the remaining user equipment.

In an embodiment, the step of granting access to a selected user equipment comprises: among the user equipment using the PRB scheduling resource eliminating as candidates for having sent the scheduling request user equipment: involved in sending data traffic, being in discontinuous reception state, or being out of synchronization, and granting access to the remaining user equipment if only one, or granting access to a prioritized user equipment among the remaining user equipment if more than one.

In an embodiment, the user equipment are prioritized in accordance with one or more of the following: quality of service class identifier, emergency call, guaranteed bit rate, active most recently, amount of data in a buffer of the user equipment for downlink transmission, relative priority of most prioritized bearer of user equipment.

In an embodiment, the base station supports the use of a single PRB scheduling resource for two or more user equipment sending scheduling requests, by allocating same PRB scheduling resource to more than one user equipment.

In an embodiment, the physical resource block (PRB) comprises a physical uplink control channel, PUCCH.

In a second aspect of the invention, the object is achieved by a base station for allocating communication resources to a user equipment. The base station supports the use of a single physical resource block, PRB, scheduling resource for two or more user equipment. The base station comprises: an input device for receiving a scheduling request on the PUCCH scheduling resource; a controller arranged to grant access to a selected user equipment of the two or more user equipment that are using the PRB scheduling resource.

In a third aspect of the invention, the object is achieved by a computer program for a base station, for allocating communication resources to a user equipment. The base station supports the use of a single physical resource block, PRB, scheduling resource for two or more user equipment. The computer program comprises computer program code, which, when run on the base station, causes the base station to perform the steps of: receiving a scheduling request on the PRB scheduling resource; granting access to a selected user equipment of the two or more user equipment using the PRB scheduling resource.

In a fourth aspect of the invention, the object is achieved by a computer program product comprising a computer program as above, and a computer readable means on which the computer program is stored.

Further features and advantages thereof will become clear upon reading the following detailed description and the accompanying drawings.

DETAILED DESCRIPTION OF EMBODIMENTS

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail. Like numbers refer to like elements throughout the description.

Figure 1:
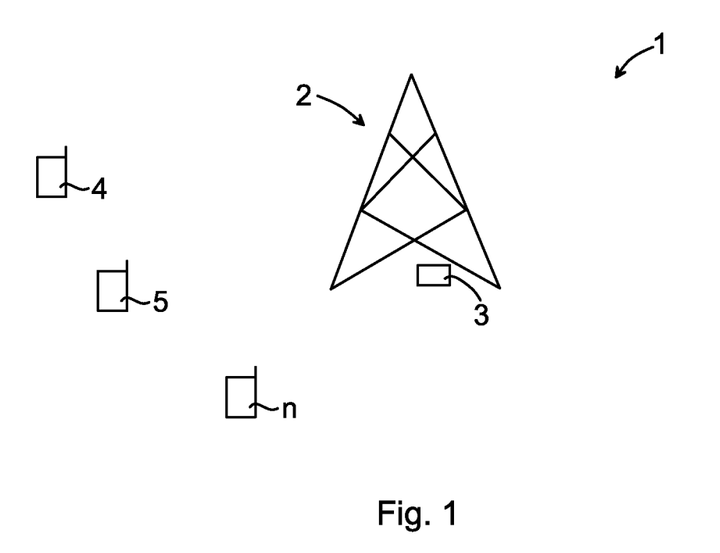
FIG. 1 illustrates schematically an environment in which embodiments of the invention may be implemented.

FIG. 1 illustrates schematically an environment in which embodiments of the invention may be implemented. A communication system 1 is illustrated comprising a base station 2, e.g. an evolved Node B or eNB in LTE, arranged to communicate with user equipment 4, 5, . . . , n using radio frequency transmitter(s) and the receiver(s). The base station 2 may further comprise a scheduling device 3, also denoted scheduler, suitable for implementing methods of different embodiments of the invention. It is realized that the base station 2 comprises numerous further components, but only parts relevant for the present invention are described.

In order to overcome the mentioned drawbacks of prior art, the base station 2 is arranged to allow over-allocation of scheduling request resources on the PUCCH. In the following, the scheduling request resources on the PUCCH is used for describing the invention, but another physical resource block (PRB) used for signaling from the user equipment 4, 5, . . . , n to the base station 2 that it has data to transmit could be used, depending for example on which air interface technology is used.

The base station 2 over-allocating the SR resources means that more than one user equipment 4, 5, . . . , n will use the same PUCCH resource for the scheduling request. The base station 2 is then in general not able to distinguish between user equipment 4, 5, . . . , n that are allocated the same scheduling request resource based only on the scheduling request resource itself.

In some cases the base station 2 can however determine which user equipment 4, 5, . . . , n sent the scheduling request. For example, if two user equipment 4, 5, . . . , n have been allocated a particular scheduling request resource and one of them has already a valid grant to send data, then it can be assumed that it was the other user equipment that sent the scheduling request.

As another example, it may be possible to determine which one of the two user equipment sent the scheduling request based on power level received by the base station 2. In particular, the base station, e.g. the eNB of a LTE system, typically regularly receives measurement reports from the user equipment. These reports indicate how large a portion of the transmitted power from the base station that was lost on the way to the user equipment. If the base station assumes that the amount of lost power in the reverse direction will behave in the same way, then the base station can make an estimation that a user equipment reporting a high received power from the base station should be detected at a high power when it sends a scheduling request. Thus: for a scheduling request received at high power, the user equipment that reports high measured power from the base station in measurement reports should be selected; for a scheduling request received at low power, the user equipment that reports low measurement power from the base station in measurement report is selected.

The base station 2 may be able to determine that one of two user equipment did not send the scheduling request, and thereby determine that the other user equipment was the one that sent the scheduling request. For example, a user equipment in discontinuous reception mode would not send a scheduling request.

As yet another example, the base station 2 may be arranged to analyze transmission patterns of the user equipment and based thereon determine which user equipment was most likely to send data at this point of time and thus most likely having sent the scheduling request.

Whenever the base station 2 is able to determine the identity of the user equipment 4, 5 that is sending the scheduling request, it sends an access grant to the identified user equipment 4, 5.

In the general case, however, the base station 2 is not able to determine the identity of the user equipment 4, 5, . . . , n that sent the scheduling request, and in such case, another approach is used. In particular, the base station 2 selects to which user equipment 4, 5, . . . , n using the particular scheduling request resource to send the grant. The selection can be made in different ways.

The base station 2 may for example send the grant based on priority of the user equipment 4, 5, . . . , n. An example of a highly prioritized user equipment is one sending an emergency call or a user equipment that has a guaranteed bit rate (GBR) bearer.

Another way of selecting which user equipment to send the grant to is based on a probability of a particular user equipment being the one sending the scheduling resource request. The selection may for example be based on activity of the user equipment 4, 5, . . . , n using the scheduling request resource. The grant may for example be sent to the user equipment which has been active the most recently. The probability that the most active user equipment is sending the scheduling request is higher than the probability that the less active user equipment is the one sending the scheduling request. By having the base station 2 allocating the same scheduling request resource to several user equipments, a larger number of user equipment can signal their need to send data by such scheduling request resource. These user equipments will have lower delays compared to using random access signaling for obtaining a grant. A lower random access signaling load thus also results.

Some added complexity in the base station 2 in handling scheduling requests could result, since the base station 2 needs to determine which user equipment 4, 5, . . . , n shall get the grant. However, the increased complexity can be mitigated by the reduced complexity resulting when the base station does not need to reserve scheduling request resources for prioritized user equipments.

The base station 2 thus allocates the same scheduling request resource to more than one user equipment. When the base station 2 receives a scheduling request on this resource, it selects which of these user equipments will get scheduled first.

Figure 2:
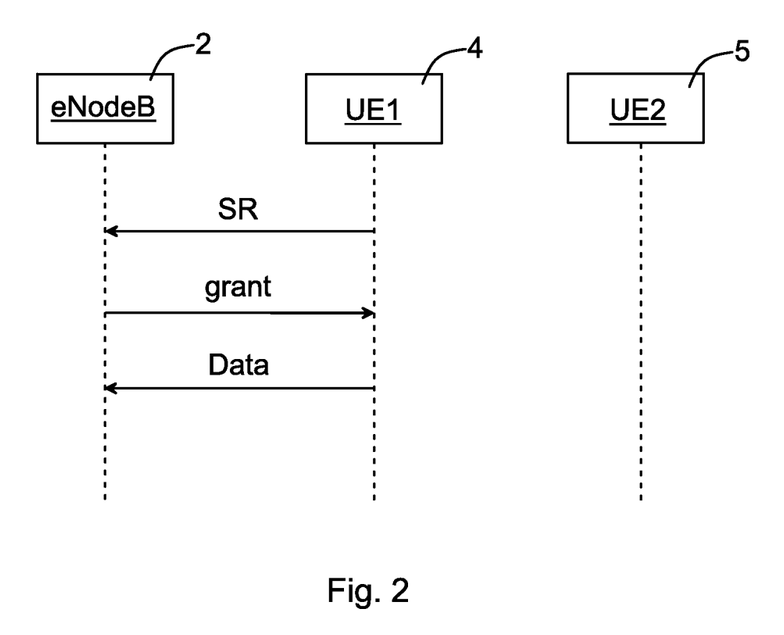
FIG. 2 is a sequence diagram illustrating signaling between a base station and a prioritized user equipment sending a scheduling request.

FIG. 2 is a sequence diagram illustrating signaling between the base station 2 and a prioritized user equipment 4 (UE1) sending the scheduling request. The base station 2 receives a scheduling request, determines the highest prioritized user equipment 4 using the scheduling request resource and sends a grant to this user equipment 4, whereupon the user equipment 4 starts sending its data.

Figure 3:
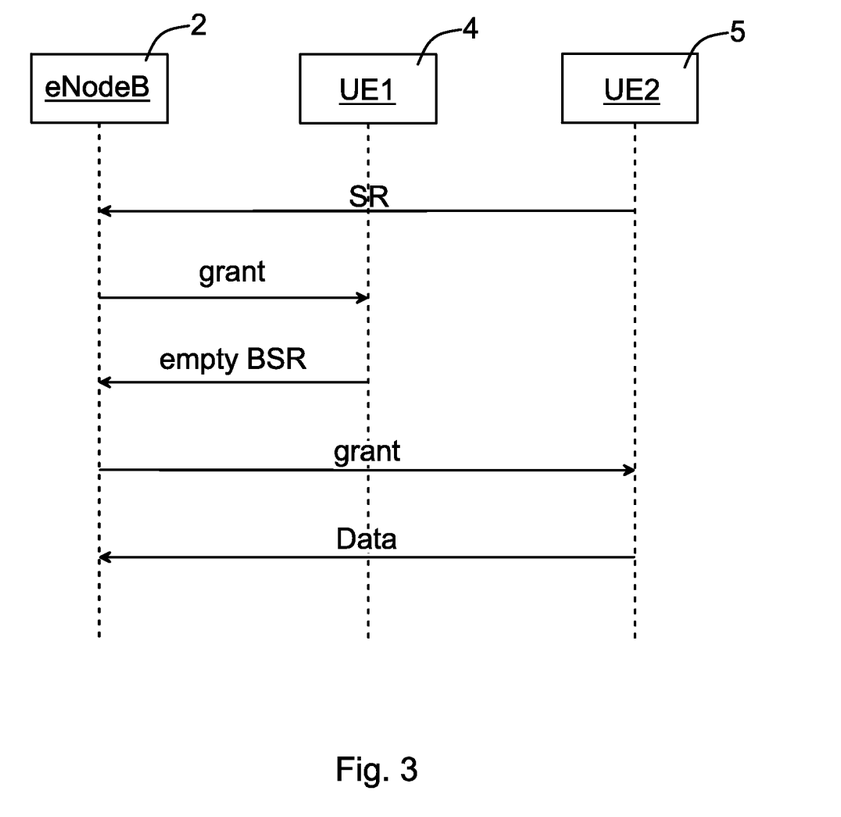
FIG. 3 is a sequence diagram illustrating signaling between a base station and a not highest prioritized user equipment sending a scheduling request.

FIG. 3 is a sequence diagram illustrating signaling between the base station 2 and a user equipment 5 (UE2), when the user equipment 5 that is not the highest prioritized (or firstly selected) that is sending the scheduling request. In particular, the base station 2 receives a scheduling request from the second user equipment 5. It then determines which user equipment, among the user equipments using this particular scheduling request resource, that has the highest priority and sends a grant to this user equipment 4 (UE1). However, in response to the grant, the base station 2 receives an empty buffer status report from the highest prioritized user equipment 4. The base station 2 then determines the next highest prioritized user equipment 5 using this particular scheduling request resource and grants access to this user equipment 5.

Typically, the time period between sending a scheduling request and sending data is about 8 ms. Purely as an example it can be mentioned, that the time between the user equipment sending a scheduling request and it getting to send data, can be as short as 16 ms for the case illustrated in FIG. 3 and described above, however depending on the load on the base station 2. This equals the time for a user equipment to perform a random access procedure. This means that for a non-prioritized user equipment, at least the same performance is obtained for the user equipment, but the base station 2 has a lower signal handling load.

It is noted that more than two user equipments can be assigned the same scheduling request resource. However, the delay may increase with the number of user equipment being assigned to the same scheduling request resource.

Figure 4:
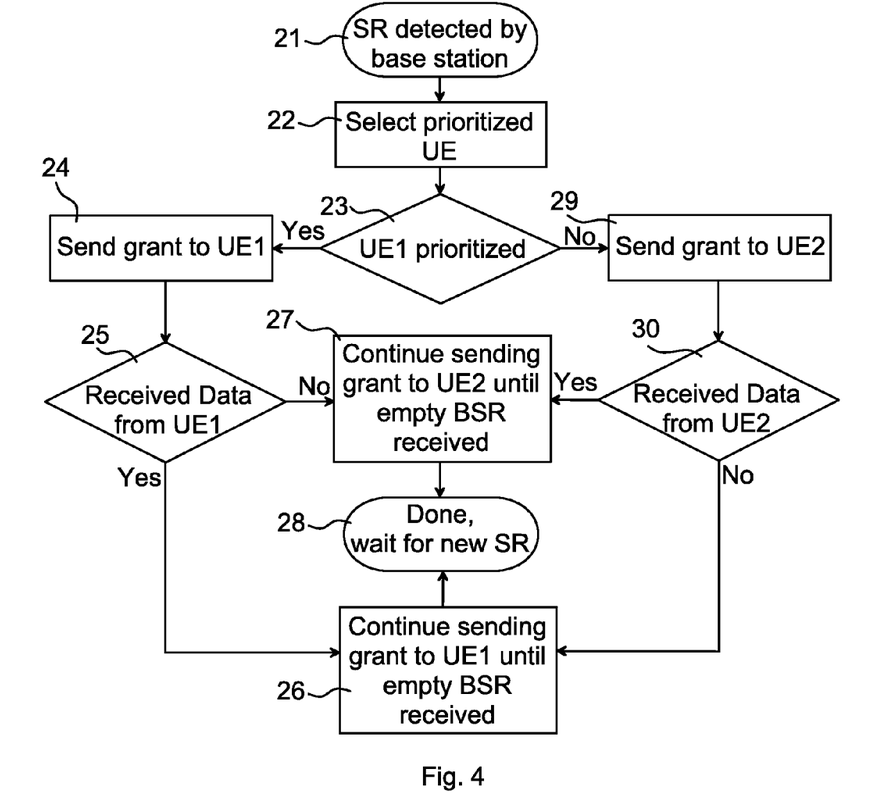
FIG. 4 illustrates a flow chart for an exemplifying prioritization made in a base station.

FIG. 4 illustrates a flow chart for an exemplifying prioritization made in the base station 2. Two user equipments UE1 and UE2 are sharing the same scheduling request resource. At box 21, the base station 2 detects a scheduling request, and then, at box 22, it selects a prioritized user equipment of the two. The selection can for example be done by determining whether a first user equipment UE1 is prioritized (box 23). If yes, then the base station 2 sends the grant to this first user equipment UE1 (box 24). Having granted access to the first user equipment UE1, the base station may start receiving data from it (box 25). If it was the first user equipment UE1 that actually sent the scheduling request, then indeed, the base station 2 starts receiving data from this user equipment UE and continues sending grant (box 26) to the first user equipment UE1 until its buffer is empty, i.e. until the base station 2 receives an empty buffer status report from the first user equipment UE1. Having received the empty buffer status report, the base station waits for another scheduling request (box 28).

However, at box 25, when the base station 2 has granted access to the first user equipment UE1, but fails to receive data from it, then the base station 2 sends a grant to the second highest prioritized user equipment UE2 (box 27). The base station 2 continues sending grants to this second user equipment UE2 until it receives an empty buffer status report. Having received the empty buffer status report, the base station waits for another scheduling request (box 28).

If, in box 23, the base station 2 determines that the first user equipment UE1 is not prioritized, then it sends the grant to the second user equipment UE2 (box 29). Then in correspondence with box 25, having granted access to the second user equipment UE2, the base station 2 may start receiving data from it (box 30). If the base station 2 receives data from the second user equipment UE2, it continues sending grants to the second user equipment UE2 until it receives an empty buffer status report (box 27) and starts waiting for another scheduling request (box 28). If the base station 2 does not receive data, it instead continues sending grant to the first user equipment UE1 (box 26). Again, having received the empty buffer status report, the base station waits for another scheduling request (box 28).

Figure 5:
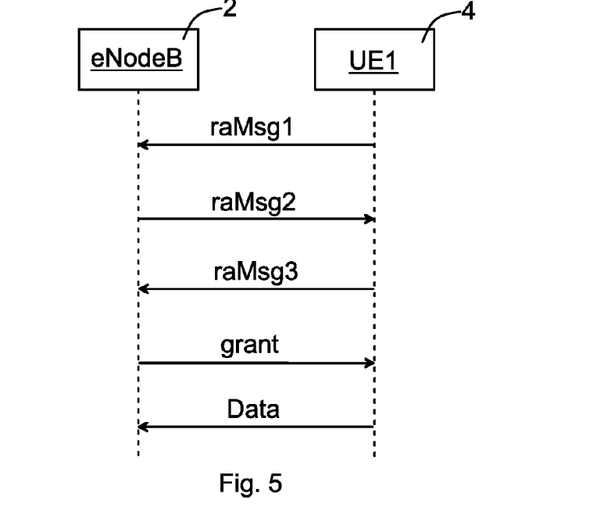
FIG. 5 is a sequence diagram for a random access signaling for scheduling resource.

FIG. 5 is a sequence diagram for a random access signaling for scheduling resource. Typically, the base station 2 receives a first random access message on a random access channel from the first user equipment 4. The base station 2 then sends a message inquiring identity of the user equipment 4. The user equipment 4 responds to this inquiry, whereupon the base station 2 sends a grant to the first user equipment 4. The base station 2 then starts receiving data from the first user equipment 4.

An algorithm by means of which the base station 2 determines which user equipment to select by prioritizing can use various inputs. One such input can be a discontinuous reception (DRX) status of the user equipment. User equipment in DRX status would be eliminated as candidates, as such user equipment does not monitor the down link channel (in order to save battery). Another input may be how much data each user equipment has in their buffer for downlink transmission, if any. A user having an empty buffer status for downlink transmission would be given a low priority, as it most likely did not send the scheduling request. Still another input may be a relative priority of the most prioritized bearer of the user equipment. Generally, criteria might be based on user equipment configuration and bearer configuration, and bearer quality class. For example, different configurations, such as Robust header compression (ROHC), service aware buffer estimation (SABE), priority based scheduling, frequency selective scheduling. Any combination of such inputs, and others, can be used to determine the priority order that the base station 2 should use when determining which user equipment to schedule first.

Figure 6:
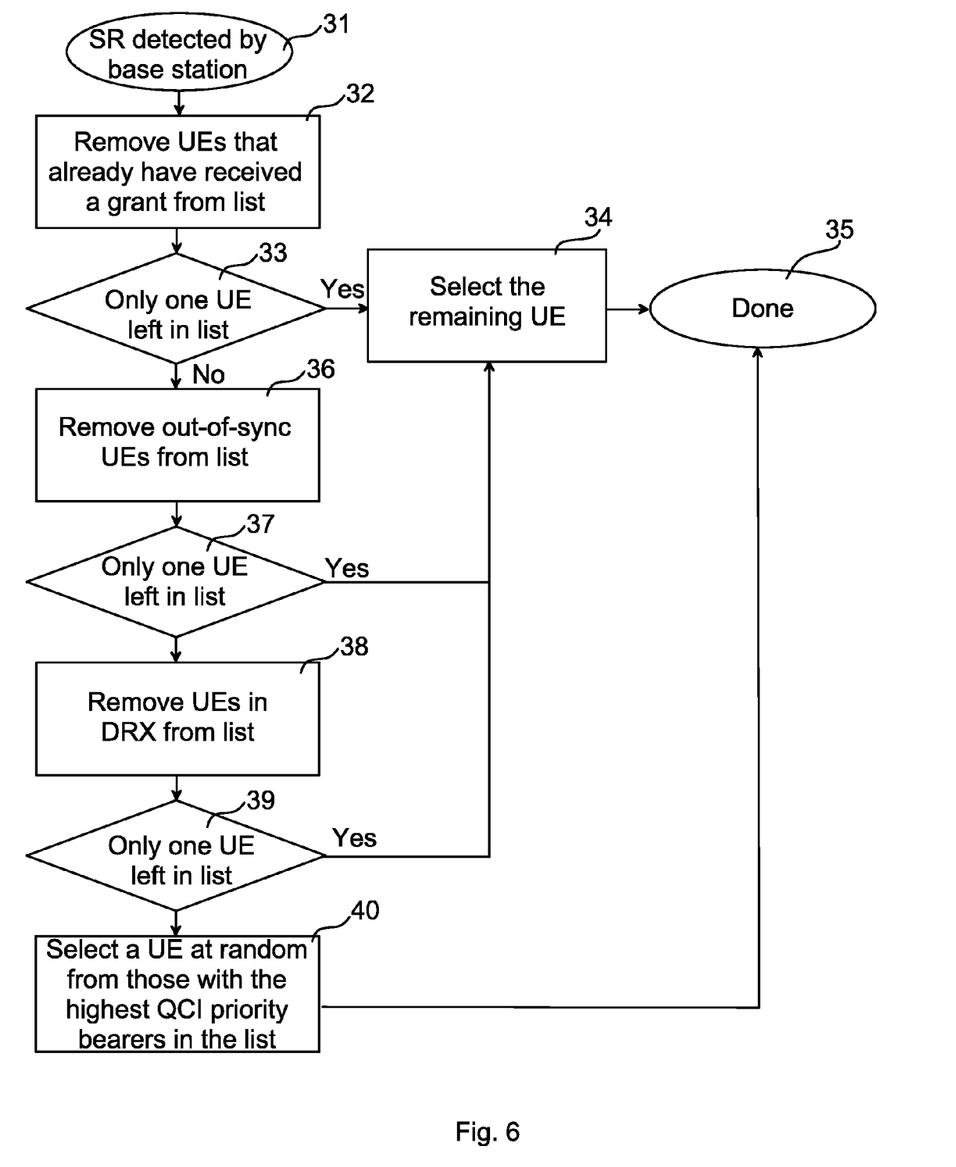
FIG. 6 illustrates a flow chart for another exemplifying prioritization made in a base station.

FIG. 6 illustrates a flow chart for an exemplifying prioritization made in the base station 2. In this example, user equipment less likely to have made the scheduling request are first eliminated as potential candidates. The base station 2 comprises a list of the user equipment 4, 5, . . . , n that are allocated a particular scheduling request resource.

At box 31, the base station 2 receives a scheduling request. At box 32, all user equipment, among the ones using this particular scheduling request resource, that already have received a grant are eliminated as candidates for having sent the scheduling request. The base station 2 then, at box 33, determines whether there is only one user equipment left on the list. If yes, then this remaining user equipment is selected (box 34) and the base station 2 is done (box 35) after having sent a grant to the user equipment.

If, at box 33, there are more than one user equipment left in the list, then all user equipment being out of synchronization are removed from the list (box 36). A user equipment that is out of synchronization may lose its scheduling request resource, and be forced to use a random access procedure firstly to obtain a grant. Such user equipment are not considered in this algorithm as potential candidates having sent the scheduling request. All user equipment that are out of synchronization but still allowed to keep their scheduling request resource are eliminated at box 33. The base station 2 then, at box 37 and in correspondence with box 33, determines whether there is only one user equipment left on the list. If yes, then this remaining user equipment is selected (box 34) and the base station 2 is done (box 35) after having sent a grant to the user equipment.

If, at box 37, there are more than one user equipment left in the list, then all user equipment being in discontinuous reception mode are removed from the list (box 38). Such user equipment can be eliminated as candidates as having sent the scheduling request, as mentioned earlier. Then again, in correspondence with box 33 and 37, the base station 2 determines (in box 39) whether there is only one user equipment left in the list. If yes, then this user equipment is selected (box 34) and the base station 2 is done (box 35) after having sent a grant to the user equipment.

If there are still more than one user equipment left, further parameters could be used for eliminating user equipment being less likely to have made the scheduling request (not illustrated). At box 40, there are still more than one user equipment left on the list over potential user equipment having sent the scheduling request, and one of these is selected at random among the user equipment with the highest Quality of Service Class indicator (QCI).

Figure 7:
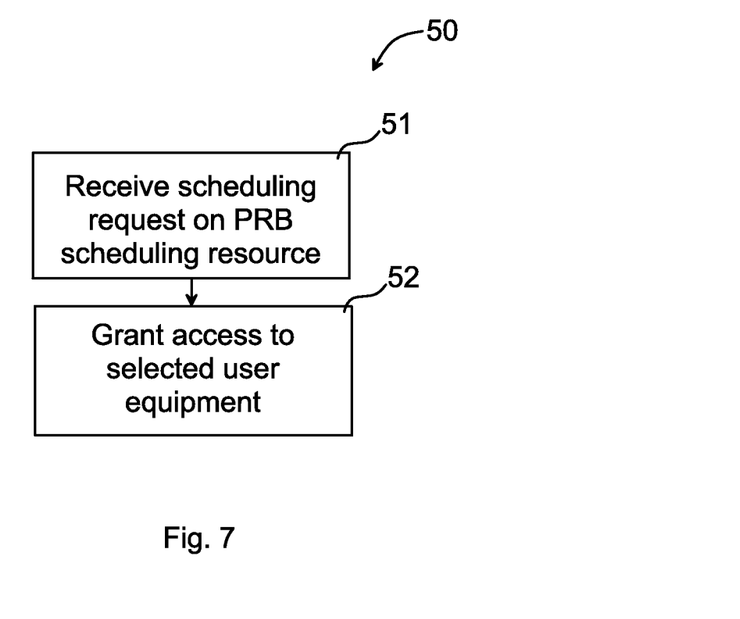
FIG. 7 illustrates steps of a method in an aspect of the invention.

FIG. 7 illustrates a method 50 in the base station 2 for allocating communication resources to the user equipment 4, 5, . . . , n. The method 50 comprises the first step of receiving 51, from a user equipment 4, 5, . . . , n a scheduling request on the physical resource block (PRB), scheduling resource, e.g. the physical uplink control channel, PUCCH.

The method 50 comprises the second step of granting access 52 to a selected user equipment 4, 5, . . . , n of the two or more user equipment 4, 5, . . . , n using the PRB scheduling resource.

Figure 8:
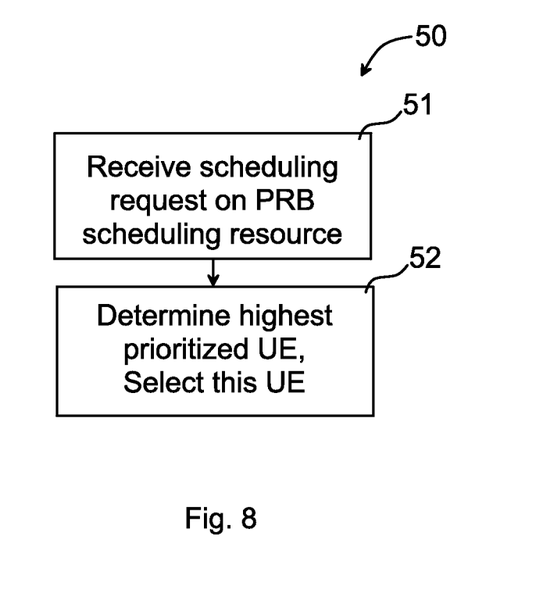
FIG. 8 illustrates an embodiment of the method in FIG. 7.

As described earlier, the selection can be made in different ways. FIG. 8 illustrates one embodiment. In this embodiment, the step of granting access 52 comprises determining the highest prioritized user equipment 4, 5, . . . , n using the PRB scheduling resource, and granting access to the determined highest prioritized user equipment 4, 5, . . . , n.

Figure 9:
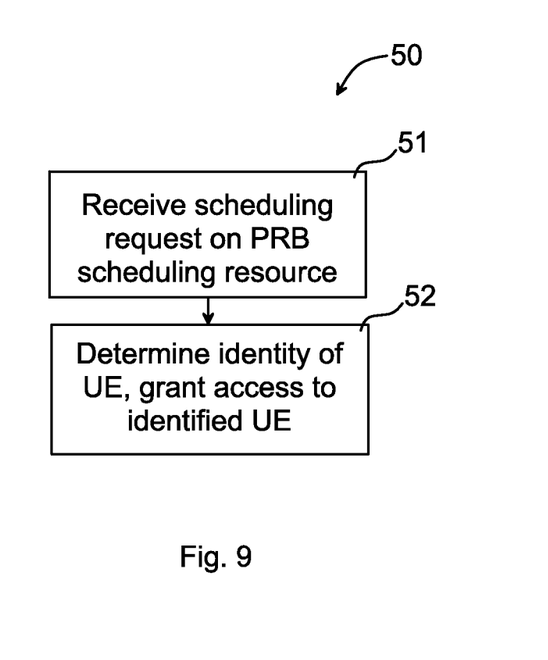
FIG. 9 illustrates another embodiment of the method in FIG. 7.

FIG. 9 illustrates a flow chart over another embodiment. In this embodiment, the step of granting access 52 comprises determining the identity of the user equipment 4, 5, . . . , n that is sending the scheduling request and then granting access to the identified user equipment 4, 5, . . . , n.

In the above embodiment, the step of determining the identity of user equipment 4, 5, . . . , n may for example comprise to among the user equipment 4, 5 using the PRB scheduling resource eliminating as candidates for having sent the scheduling request, user equipment 4, 5, . . . , n: involved in sending data traffic, being in discontinuous reception state, or being out of synchronization. The identity of the user equipment 4, 5, . . . , n having sent the scheduling request is then determined to be the remaining user equipment 4, 5, . . . , n if only one.

If the determination of identity of the user equipment 4, 5, . . . , n having sent the scheduling request fails, the step of granting access instead comprises granting access to a prioritized user equipment 4, 5, . . . , n among the remaining user equipment 4, 5, . . . , n.

Figure 10:
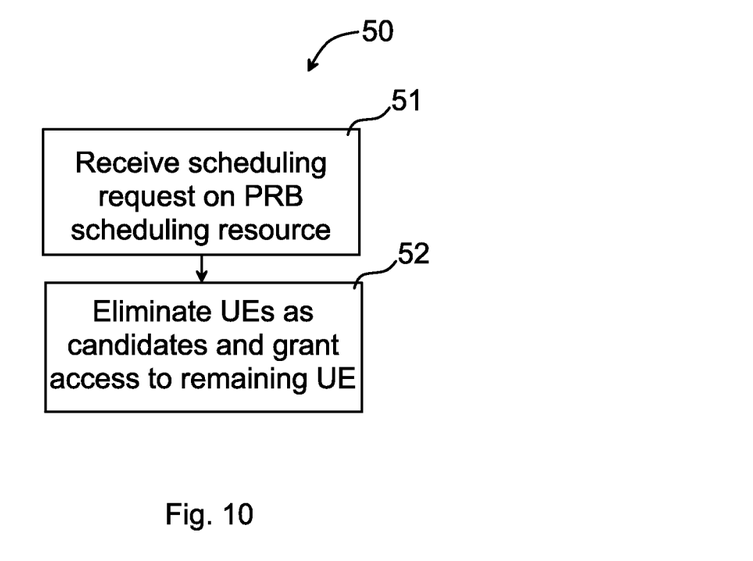
FIG. 10 illustrates yet another embodiment of the method in FIG. 7.

FIG. 10 illustrates yet another embodiment. In this embodiment, the step of granting access 52 to a selected user equipment 4, 5, . . . , n comprises to, among the user equipment 4, 5, . . . , n using the PRB scheduling resource, eliminating as candidates for having sent the scheduling request user equipment 4, 5, . . . , n: involved in sending data traffic, being in discontinuous reception state, or being out of synchronization. The base station 2 then grants access to the remaining user equipment 4, 5, . . . , n if only one, or grants access to a prioritized user equipment 4, 5, . . . , n among the remaining user equipment 4, 5, . . . , n if more than one.

In all the embodiments of FIGS. 8, 9 and 10, the user equipment 4, 5, . . . , n can be prioritized for example in accordance with one or more of the following: quality of service class identifier, emergency call, guaranteed bit rate, active most recently, amount of data in a buffer of the user equipment for downlink transmission, relative priority of most prioritized bearer of user equipment, based on transmission patterns of user equipment.

Figure 11:
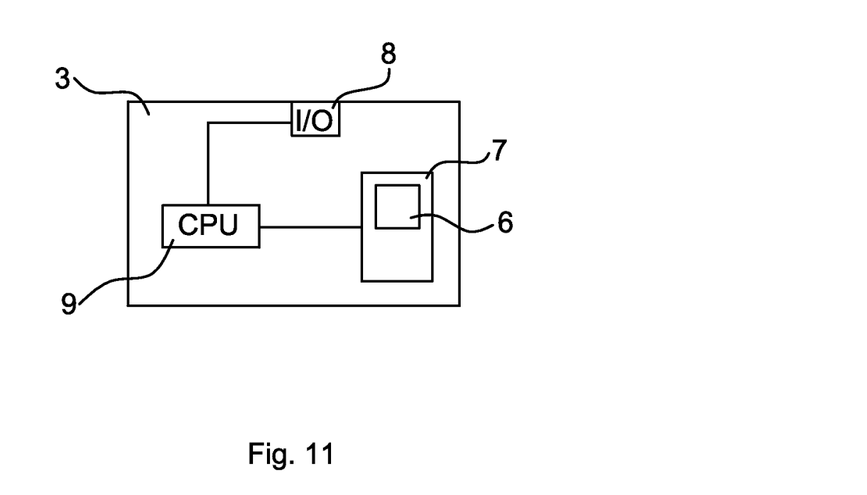
FIG. 11 illustrates an exemplifying way of implementing a method in a base station in an aspect of the invention.

FIG. 11 illustrates an exemplifying way of implementing the methods as described in the base station 2. The base station 2 may comprise a scheduling device 3 arranged to perform the methods as described. The scheduling device 3 comprises a processor 9, e.g. a central processing unit, microcontroller, digital signal processor (DSP), etc., capable of executing software instructions stored in a computer program product 7 e.g. in the form of a memory. The processor 9 is connected to an input device 8, that receives inputs (scheduling requests) from user equipment 4, 5, . . . , n, typically via some other device, e.g. a transceivers, of the base station 2. It is noted that although only one processor 9 is illustrated in FIG. 11, the implementation may comprise distributed hardware so that several CPUs are used rather than one when running the software.

The described methods and algorithms or parts thereof for use in handling scheduling requests may be implemented e.g. by software and/or application specific integrated circuits in the processor 9. To this end, the scheduling device 3 may further comprise a computer program 6 stored on a computer program product 7.

With reference still to FIG. 11, the invention also encompasses such computer program 6 for handling scheduling requests. The computer program 6 comprises computer program code which when run on the scheduling device 3, and in particular the processor 9 thereof, causes the scheduling device 3 to perform the methods as described.

A computer program product 7 is also provided comprising the computer program 6 and computer readable means on which the computer program 6 is stored. The computer program product 7 can be any combination of read and write memory (RAM) or read only memory (ROM). The computer program product 7 may also comprise persistent storage, which, for example can be any single one or combination of magnetic memory, optical memory, or solid state memory.

The invention claimed is:

1. A method in a network node for allocating communication resources, the method comprising:
   selecting, from a set of available Physical Resource Blocks (PRBs), a single PRB for use in transmitting to the network node a scheduling request (SR);
   allocating to each user equipment (UE) included in a set of two or more UEs the selected single PRB, such that each of said UEs may transmit an SR to the network node on the same single PRB;
   receiving an SR transmitted by one of said UEs on the allocated single PRB; and
   in response to receiving the SR:
   a) determining which UE in the set of two or more UEs is the highest prioritized UE;
   b) selecting the determined highest prioritized UE; and
   c) granting access to the selected UE.

2. The method of claim 1, wherein
   the step of determining which user equipment in the set of two or more user equipment is the highest prioritized user equipment comprises, among the UEs to which the single PRB was allocated eliminating as candidates for having sent the SR each UE that: a) is involved in sending data$_{13}$traffic, b) is in a discontinuous reception state, or c) is out of synchronization, and
   the step of selecting the determined highest prioritized UE comprises selecting the remaining UE if only one UE was not eliminated in the eliminating step, or selecting a prioritized user equipment among the remaining UEs if more than one UE was not eliminated.

3. The method of claim 2, wherein determining which UE in the set of two or more UEs is the highest prioritized UE comprises determining whether a UE included in said set of UEs has a valid grant to send data.

4. The method of claim 1, wherein the user equipment are prioritized in accordance with one or more of the following: quality of service class identifier, emergency call, guaranteed bit rate, active most recently, amount of data in a buffer of the user equipment for downlink transmission, relative priority of most prioritized bearer of user equipment, based on transmission patterns of user equipment.

5. The method of claim 1, wherein determining which UE in the set of UEs is the highest prioritized UE comprises comparing a received power level of the SR with a known power level for a UE included in the set of UEs.

6. The method of claim 1, wherein determining which UE in the set of UEs is the highest prioritized UE comprises determining the UE in the set of UEs that has the highest probability of being the UE that sent the received SR.

7. The method of claim 6, wherein determining the UE in the set of UEs that has the highest probability of being the UE that sent the received SR is based on each UEs recent activity.

8. The method of claim 1, wherein the a set of available PRBs consists only of PRBs on a Physical Uplink Control Channel (PUCCH).

9. A method in a base station for allocating communication resources to a user equipment, the base station supporting the use of a single physical resource block (PRB) scheduling request resource for two or more user equipments by allocating the same PRB scheduling request resource to more than one user equipment, the method comprising:
   receiving, from a user equipment of the two or more user equipment, a scheduling request on the single PRB scheduling request resource,
   granting access to a selected user equipment of the two or more user equipment using the single PRB scheduling request resource, wherein the step of granting access comprises:
   determining identity of the user equipment sending the scheduling request, wherein the step of determining the identity of user equipment comprises:
   among the user equipment using the single PRB scheduling request resource eliminating as candidates for having sent the scheduling request user equipment: involved in sending data traffic, being in discontinuous reception state, being out of synchronization, and
   determining the identity of user equipment having sent the scheduling request to be the remaining user equipment if only one,
   granting access to the identified user equipment
   wherein in case of failing to determine identity of the user equipment having sent the scheduling request, the step of granting access comprises granting access to a prioritized user equipment among the remaining user equipment.

10. A network node for allocating communication resources to a user equipment, the network node comprising:
   a processor for selecting a single Physical Resource Block (PRB) from a set of available PRBs and for allocating to each user equipment (UE) included in a set of two or more UEs the selected single PRB, such that each of said UEs may use the same single PRB to transmit a scheduling request (SR) to the network node; and
   a receiver for receiving an SR transmitted using said allocated single PRB, wherein
   the controller is configured such that, in response to the receiver receiving the SR, the controller: determines which user equipment in the set of two or more user equipment is the highest prioritized user equipment, selects the determined highest prioritized user equipment, and grants access to the selected user equipment.

* * * * *